M. E. FRANCISCO.
DRAFT DEFLECTOR FOR MOTOR VEHICLES.
APPLICATION FILED OCT. 4, 1919.
1,380,471.  Patented June 7, 1921.
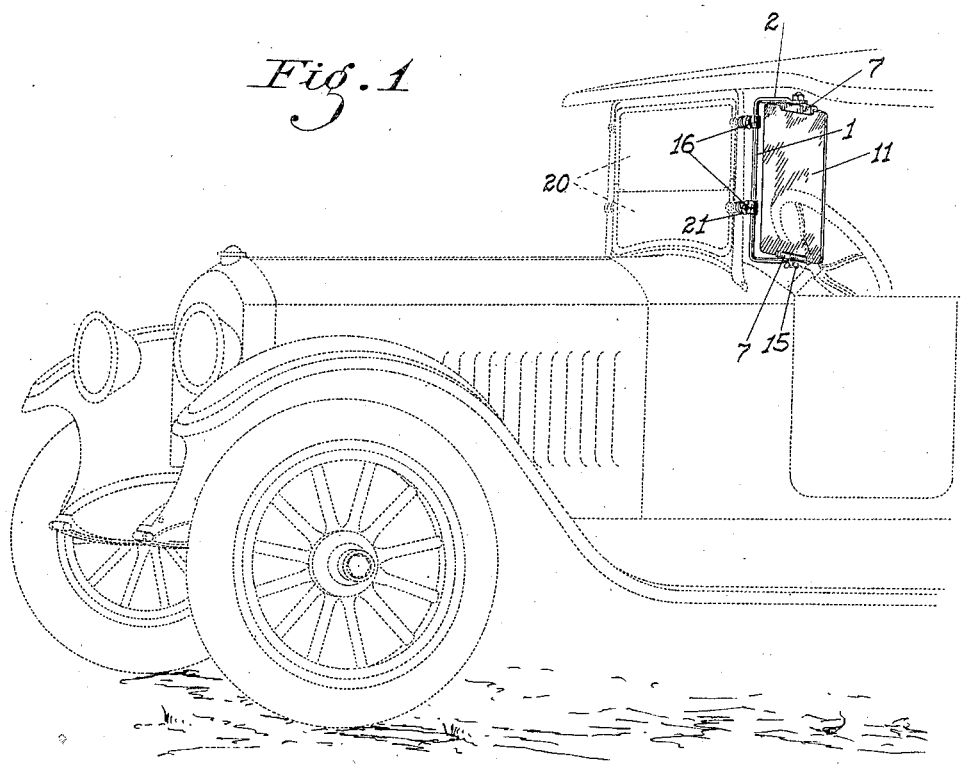
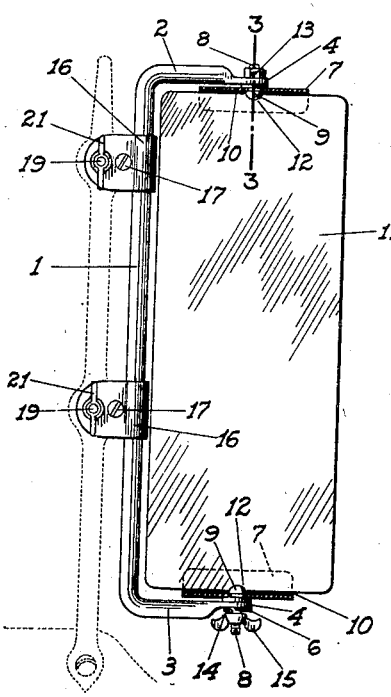
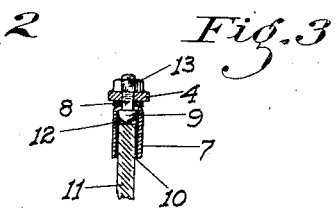
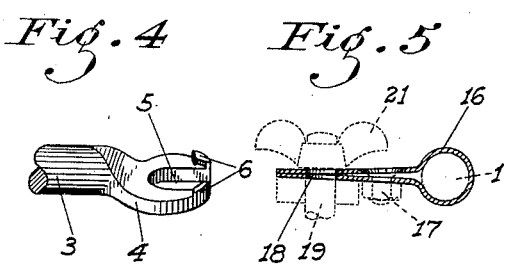
INVENTOR.
Marshall E. Francisco
BY
ATTORNEY

UNITED STATES PATENT OFFICE.

MARSHALL E. FRANCISCO, OF FRESNO, CALIFORNIA, ASSIGNOR, BY MESNE ASSIGNMENTS, OF ONE-HALF TO LOUIS W. DARDEN AND ANDREW O. WILSON, BOTH OF FRESNO, CALIFORNIA.

DRAFT-DEFLECTOR FOR MOTOR-VEHICLES.

1,380,471.      Specification of Letters Patent.      Patented June 7, 1921.

Application filed October 4, 1919. Serial No. 328,540.

*To all whom it may concern:*

Be it known that I, MARSHALL E. FRANCISCO, a citizen of the United States, residing at Fresno, county of Fresno, State of California, have invented certain new and useful Improvements in Draft Deflectors for Motor-Vehicles; and I do declare the following to be a full, clear, and exact description of the same, reference being had to the accompanying drawings, and to the characters of reference marked thereon, which form a part of this specification.

This invention relates to improvements in draft deflectors for motor vehicles, being particularly intended for use on automobiles of the so-called pleasure type in connection with the windshield thereof.

The principal object of the invention is to produce a device which is adapted to be attached to the windshield frame by means of the nuts on the pivotal shield-panel bolts, and whose adaptability in this respect is irrespective of the diameter of the windshield frame, the slant thereof or the spacing of said bolts.

Another object of the invention is to so mount the glass deflecting panel that the same may be instantly adjusted to any angle relative to the windshield, and which is firmly held in the frame without any tendency to rattle or vibrate, and yet without being pinched by metal members in any way liable to cause warpage and breaking of the glass.

A third object is to mount this glass plate that in the possible event of its breaking, it may be easily and quickly removed and replaced by another.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a perspective outline of the front portion of an automobile showing my improved deflector mounted to the windshield.

Fig. 2 is a side elevation of the deflector, with the glass-holding members in section.

Fig. 3 is a fragmentary cross section taken on a line 3—3 of Fig. 2.

Fig. 4 is a fragmentary perspective showing a slotted frame-end.

Fig. 5 is an enlarged top section of the frame-clamp.

Referring now more particularly to the characters of reference on the drawings the numeral 1 denotes a vertical bar or rod, having its ends turned at right angles thereto to form upper and lower horizontal members 2 and 3 respectively. The outer ends of these members are flattened as at 4, the upper flattened portion having a plain hole therethrough, but the lower one being slotted as at 5, there being raised lugs 6 on each side of the slot at the outer ends thereof.

Facing each other and adjacent the inner faces of the horizontal ends of the frame are glass-holding members 7, substantially grooved or U-shaped in cross section. Secured to these members and projecting outwardly therefrom are bolts 8 adapted to pass through the hole and slot in the ends of the portions 2 and 3. These bolts are provided with round heads 9 which project into the members 7, the same being lined with felt 10 or similar material and adapted to receive a glass panel 11 therebetween. A small semicircle of this panel is cut out of the outer edge of this panel at the top and bottom, as at 12, in order that the round bolt heads 9 may seat therein and hold the glass against horizontal movement.

The upper bolt 8 has a plain nut 13 thereon, bearing on the flat portion 4 of the frame, while the lower one has a spring washer 14 thereon and seated behind the lugs 6, and a wing nut 15, so that the tension may be varied at will in order to turn the glass for angular adjustment.

A pair of one-piece clamp members 16 are slidable on the bar 1, and are adapted to be clamped thereto by means of bolts 17. These clamps terminate in a flat portion provided with an orifice 18, adapted to slip over either of the pivotal bolts 19 of the windshield panels 20, and to be secured thereto by the wing or other nuts 21 with which such bolts are ordinarily equipped.

It will therefore be evident that the frame 1 may be in itself angled relative to the windshield while the glass panel 11 may also be angled relative to the frame.

Also it will be noted that there need be no metal in front of the said panel to obstruct and confuse the view therethrough.

When necessary to remove or replace the glass 11, the same is turned at a right angle to the frame 1. The wing nut 15 may then be loosened on its bolt sufficiently to allow the washer 14 to pass over the lugs 6. The lower bolts 8 may then be drawn out of the slot 5, the hole in the upper end of the frame being sufficiently large to allow the bolt therein to have a certain amount of play. The glass can then of course be easily removed by merely drawing the holding members 7 away from the same.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A draft deflector for automobiles comprising a frame adapted to be adjustably mounted to the windshield of the car, horizontally positioned and opposed grooved members pivotally mounted in the ends of the frame, a glass panel positioned between and held by the grooved members, means for preventing horizontal movement of the panels in the grooved members, and means for removing the panel from the grooved members by relative movement in a vertical plane, such means including bolts attached to the grooved members and passing through the horizontal ends of the frame, one of said bolts being permanently mounted therein, but the other being adapted to move away from the frame-end when the panel is turned at right angles thereto, such frame-end being slotted for the passage of the bolt therefrom, whereby the grooved member may then be drawn away from the panel.

2. A draft deflector for automobiles comprising a frame having horizontal arms, a glass panel between the arms, horizontally grooved members pivoted at the outer ends of the arms and arranged to support the panel and prevent sliding movement thereof, one of such grooved members being permanently mounted in its arm, a bolt attached to the other grooved member and projecting through the corresponding arm, the latter being slotted to its outer end, and means whereby said bolt cannot normally slide in the slotted arm.

3. A draft deflector for automobiles comprising a frame having horizontal arms, a glass panel between the arms, horizontally grooved members pivoted at the outer ends of the arms and arranged to support the panel and prevent sliding movement thereof, one of such grooved members being permanently mounted in its arm, a bolt attached to the other grooved member and projecting through the corresponding arm, the latter being slotted to its outer end, lugs on the ends of the slotted portion of the arm projecting therefrom on the side opposite the grooved member, and means on the bolt on said side for holding the grooved member in position relative to the frame and normally held against sliding movement with the bolt by the lugs.

In testimony whereof I affix my signature in presence of two witnesses.

MARSHALL E. FRANCISCO.

Witnesses:
MARIE JORGENSEN,
MARIAN NELSON.